United States Patent
Harshey et al.

(10) Patent No.: US 9,837,897 B2
(45) Date of Patent: Dec. 5, 2017

(54) BUCK CONVERTER

(71) Applicant: NXP B.V., Eindhoven (NL)

(72) Inventors: Jitendra Prabhakar Harshey, Bangalore (IN); Ramesh Karpur, Bangalore (IN); Pankaj Agrawal, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/180,238

(22) Filed: Jun. 13, 2016

(65) Prior Publication Data

US 2016/0380534 A1 Dec. 29, 2016

(30) Foreign Application Priority Data

Jun. 24, 2015 (EP) .................... 15173693

(51) Int. Cl.
  H02M 3/15 (2006.01)
  H02M 3/157 (2006.01)
  H02M 1/08 (2006.01)
  H02M 3/158 (2006.01)
  H02M 1/00 (2006.01)

(52) U.S. Cl.
  CPC ............ H02M 3/157 (2013.01); H02M 1/08 (2013.01); H02M 3/158 (2013.01); H02M 2001/0006 (2013.01); H02M 2001/0009 (2013.01); H02M 2001/0032 (2013.01); Y02B 70/16 (2013.01)

(58) Field of Classification Search
  CPC ................... H02M 1/08; H02M 3/158; H02M 2001/0006; H02M 2001/0032; H02M 3/157; H02M 2001/0009
  See application file for complete search history.

(56) References Cited

U.S. PATENT DOCUMENTS

2012/0313604 A1* 12/2012 Huda ................. H02M 3/1588
                                                    323/282
2013/0271098 A1    10/2013 Attianese et al.
2015/0054340 A1*  2/2015 Hayes ..................... H02M 1/36
                                                    307/31

(Continued)

OTHER PUBLICATIONS

Chen, Jingdong; "Determine Buck Converter Efficiency in PFM Mode"; Power Electronics Technology; retrieved from the internet May 30, 2016 http://powerelectronics.com/site-files/powerelectronics.com/files/archive/powerelectronics.com/mag/709PET22.pdf ; pp. 28-33 (Sep. 2007).

(Continued)

*Primary Examiner* — Jue Zhang
*Assistant Examiner* — Lakaisha Jackson

(57) ABSTRACT

A buck converter is described having a buck converter output for outputting an output supply voltage; a first power supply domain operably coupled to a power source; a second power supply domain; a power supply controller coupled to the first power supply domain, the second power supply domain and the buck converter output; wherein the power supply controller is configured to supply power to the second power supply domain from the first power supply domain or the buck converter output, in dependence of the buck converter output supply voltage. Changing the current supplied to the second power supply domain to the buck converter output may reduce the quiescent current consumption from a battery power source, prolonging battery life.

16 Claims, 7 Drawing Sheets

(56) References Cited

U.S. PATENT DOCUMENTS

2015/0131334 A1   5/2015   Saji et al.

OTHER PUBLICATIONS

Extended European Search Report for Patent Appln. No. EP 1517693.1 (dated Jan. 21, 2016).
Long, Changbo et al; "Power-Efficient Pulse Width Modulation DC/DC Converters with Zero Voltage Switching Control"; Proceedings of the 2006 International Symposium on Low Poser Electronics and Design; pp. 326-329 (2006).
Morra, A., et al; "A Buck Converter Operating in PFM mode, Mathematical Model and Simulation Analysis"; IEEE 29th International Telecommunications Energy Conference; pp. 23-26 (2007).
Mulligan, Michael D. et al; "5. A Constant-Frequency Method for Improving Light-Load Efficiency in Synchronous Buck Converters"; IEEE Power Electronics Letters, vol. 3, Issue 1; (Mar. 2005).
Stratakos, A. J., et al; "A low-voltage CMOS DC-DC converter for a portable battery-operated system"; 25th Annual IEEE Power Electronics Specialists Conference; pp. 619-626 (1994).

* cited by examiner

BUCK CONVERTER

CROSS-REFERENCE TO RELATED APPLICATIONS

This application claims the priority under 35 U.S.C. §119 of European patent application no. 15173693.1, filed Jun. 24, 2015 the contents of which are incorporated by reference herein.

FIELD

This disclosure relates to a buck converter for dc-dc voltage conversion.

BACKGROUND

A buck converter is used in switch mode power supplies for DC to DC voltage conversion. Buck converter efficiency may be reduced due to the switching behaviour of the gate driver and power switches. These losses may be categorized as switching losses, conduction loss in the power switches mainly determined by the on resistance of the high and low side power switches, and quiescent current loss in the supporting circuitry which provides bias currents and reference voltages to the gate driver, control loop analogue blocks and proportional integration (PI) controller. Reducing these losses may improve the efficiency of the buck converter.

SUMMARY

Various aspects are defined in the accompanying claims. In a first aspect there is defined a buck converter comprising a buck converter output for outputting an output supply voltage, a first power supply domain operably coupled to a power source; a second power supply domain, a power supply controller coupled to the first power supply domain, the second power supply domain and the buck converter output; wherein the power supply controller is configured to supply power to the second power supply domain from at least one of the first power supply domain and the buck converter output, in dependence of the buck converter output supply voltage.

By changing the primary source of the power or current supplied to the second power supply domain from the first power supply domain to the output of the buck converter, the quiescent current continuously drawn from the power source, which may be a battery, may be reduced which may increase the buck converter efficiency. Increasing the efficiency of the buck converter when included in low power, battery operated devices such as RF transceivers used in ZigBee Link Light, or sensors may help to prolong the operation of the product by increasing the battery life. The proportion of power or current supplied to the second power supply from the buck converter may gradually increase as the buck converter output voltage increases.

In embodiments the power supply controller may further comprise a first voltage regulator having a first voltage regulator input operably coupled to the power source, and a first regulated voltage output coupled to the second power supply domain; and a second voltage regulator having a second voltage regulator input coupled to the buck converter output and a second voltage regulator output coupled to the second power supply domain.

In embodiments the first voltage regulator may have a higher output impedance than the second voltage regulator.

The first voltage regulator and second voltage regulator outputs may always be connected to the second power supply domain. If the second voltage regulator has a lower output impedance than the first voltage regulator, then more current will be drawn from the second voltage regulator and consequently the buck converter output. In this way the change in supply source from the first power supply domain to the buck converter output may be reliable and glitch free.

In embodiments, the first voltage regulator may comprise a voltage scaler. The first power supply domain may have a different voltage supply level than the second power supply domain.

In embodiments the power supply controller may further comprise a switch arranged between the buck converter output and the second power supply domain and wherein the power supply controller is operable to switchably couple the buck converter output to the second power supply domain. The power supply controller may couple to the buck converter output to the second power supply domain by switching. The timing of the switch over may be determined by buck converter output voltage level, ramp up speed or may be a user defined control signal.

In embodiments the power supply controller may be operable to switchably couple the buck converter output to the second power supply domain during a start-up phase of the buck converter.

In embodiment the power supply controller may be operable to switchably couple the buck converter output to the second power supply domain in response to the buck converter output stabilizing.

In embodiments of the buck converter including a first voltage regulator and a second voltage regulator, at least one of the first voltage regulator and the second voltage regulator may comprise a low drop-out (LDO) regulator.

In embodiments of the buck converter including a first voltage regulator and a second voltage regulator the first voltage regulator may be configured to output a regulated voltage value which is less than the second regulated voltage output.

If the first regulator has a lower voltage output than the second voltage regulator, the current supply to the second power supply domain may be steered from the first regulator to the second regulator which allows a glitch free change over as both regulators are connected to the second power supply domain. This may prevent an unintended reset of the buck converter.

In embodiments of the buck converter where the power supply controller includes a switch, the power supply controller may comprise a further switch arranged between the first power supply domain and the second power supply domain, wherein the further switch is coupled to the controller and the controller is operable to decouple the first power supply domain from the second power supply domain when the output of the second voltage regulator is switchably coupled to the second power supply domain. A further switch may completely disconnect the second power supply domain from the first power supply domain once all the current can be supplied from the buck converter output.

In embodiments, the buck converter may comprise a pulse width modulation (PWM) controller coupled to the second power supply domain. A PWM controller may have lower power requirements and so may be connected to a power supply rail or domain having a lower voltage than the first power supply domain.

In embodiments, the buck converter may comprise a plurality of MOS power transistors coupled to the first power supply domain.

In embodiments of the buck converter including a plurality of MOS power transistors, the buck converter may include a gate driver coupled to each of the gates of the plurality of MOS power transistors and wherein the gate driver is coupled to the first power supply domain.

The power switches and gate drivers for the power switches in a buck converter may have higher power requirements than the other circuitry and so may be connected to the first power domain which may have a supply rail supplied with a higher voltage than the supply rails in the second power supply domain.

In embodiments, the buck converter may be included in a RF transceiver.

In a second aspect, there is described a method of operating a buck converter, the buck converter comprising a buck converter output, a first power supply domain operably coupled to a power source, a second power supply domain coupled to the first power supply domain, a power supply controller coupled to the first power supply domain, the second power supply domain and the buck converter output; wherein the power supply controller is configured to supply power to the second power supply domain from the first power supply domain or the buck converter output, in dependence of the buck converter output supply voltage.

BRIEF DESCRIPTION OF THE DRAWINGS

In the figures and description like reference numerals refer to like features. Embodiments of the invention are now described in detail, by way of example only, illustrated by the accompanying drawings in which.

DESCRIPTION

Figure 1:
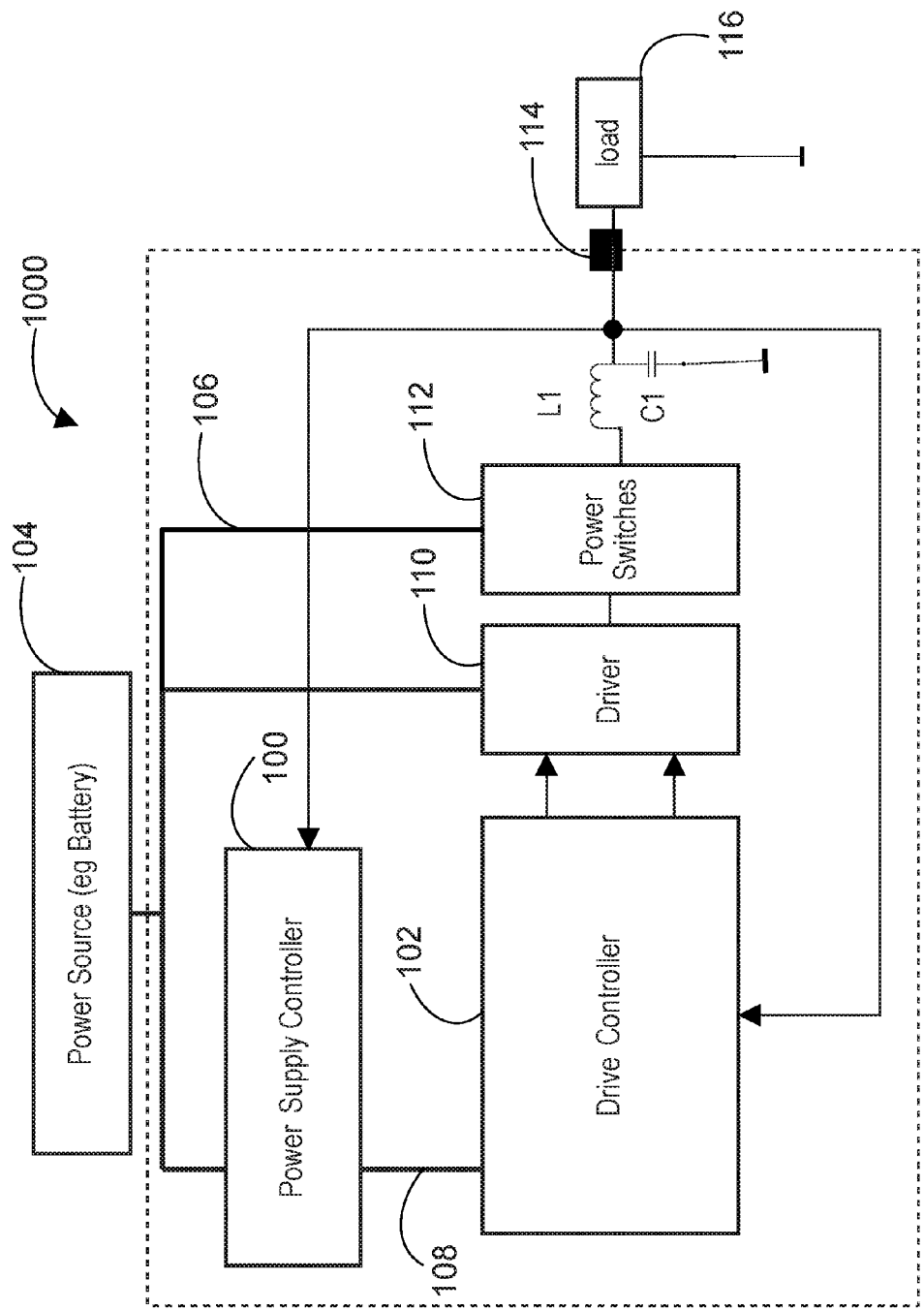
FIG. 1 shows a buck converter according to an embodiment.

FIG. 1 shows a buck converter 1000. A power supply controller 100 may have an input connected to a first power supply domain 106. A power supply controller 100 may have an input connected to a buck converter output 114. The power supply controller 100 may have a power supply output connected to a second power supply domain 108. The first power supply domain 106 may be connected to a gate driver 110. The first power supply domain 106 may be connected to power switches 112. The second power supply domain 108 may be connected to a drive controller 102. The drive controller 102 may have outputs connected to the gate driver 110. The gate driver 110 may have an output connected to power switches 112. The output of power switches 112 may be connected to a first terminal of an inductor L1. A second terminal of inductor L1 may be connected to a first terminal of capacitor C1. A second terminal of capacitor C1 may be connected to a ground terminal. The second terminal of inductor L1 may be connected to the buck converter output 114.

In operation the first power supply domain 106 is connected to a power source 104, for example a battery. The first power supply domain 106 may supply power directly to the driver circuit 110 and the power switches 112. The drive controller 102 which typically generates either a pulse width modulation (PWM) signal or a pulse frequency modulation (PFM) signal may receive power from the second power supply domain 108. Initially on power up or following a reset, the output voltage of the buck converter output 114 will ramp up to a desired voltage level used to supply an external load 116 connected to the buck converter 1000. The external load 116 may include circuitry to be powered by a DC-DC converter including the buck converter 1000. This circuitry may include RF transceiver circuits. The desired voltage level may typically be a fixed predetermined level or may be a user programmed level in the drive controller 102. The power supply controller 100 may initially supply power to the second power supply domain 108 from the first power supply domain 106, which effectively draws current directly from the power source 104. As the buck converter output voltage ramps up, the power supply controller 100 may supply power to the second power supply domain from the buck converter output 114. This may reduce the quiescent current drawn from a battery and so improve the efficiency of the buck converter. For portable or low power systems such as ZigBee RF transceivers including the buck converter 1000, this may extend the life of the battery.

The power supply controller 100 may have a lower impedance path between the buck converter output 114 and the second power supply domain 108, than between the first power supply domain and the second power supply domain 108. In this case the transition between supplying power from the first power supply domain 106 to the second power supply domain 108 may be gradual as the voltage on the buck converter output 114 increases. Alternatively or in addition, the power supply controller may switch the supply to the second power supply domain 108 from the first power supply domain 106 to the buck converter output 114 once the voltage at the buck converter output 114 has reached a predetermined voltage level. The predetermined voltage level may be the required output voltage to supply the external load 116 or may be a different lower value.

Figure 2:
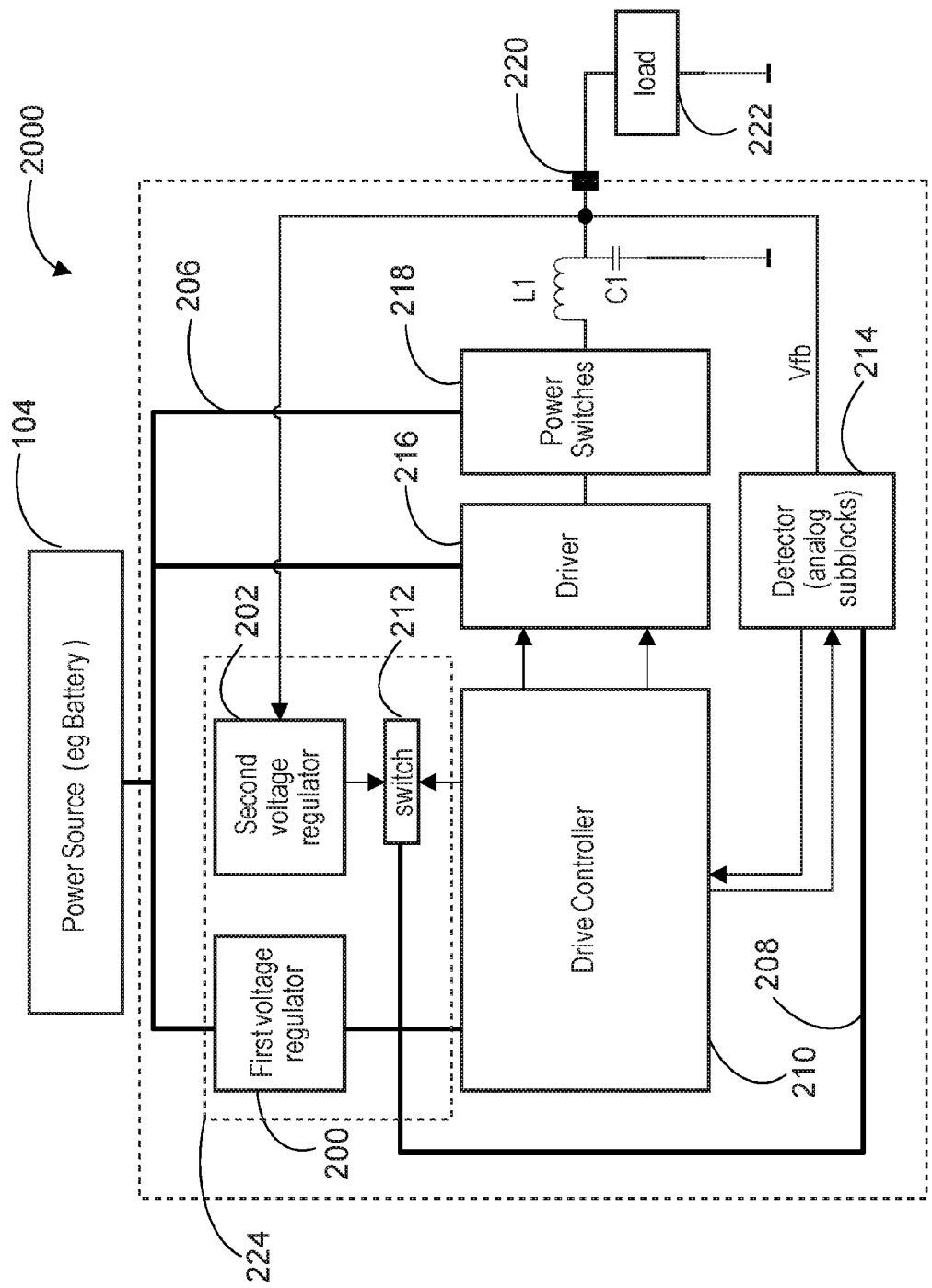
FIG. 2 illustrates a buck converter according to an embodiment.

FIG. 2 shows a buck converter 2000. A first voltage regulator 200 may have an input which is coupled to a first power supply domain 206. The first voltage regulator 200 may have a voltage output connected to a second power supply domain 208. The first power supply domain 206 may supply power to a driver circuit 216 of the synchronous buck converter 2000. The first power supply domain 206 may supply power to the power switches 218. The second power supply domain 208 may supply power to a drive controller 210. The second power supply domain 208 may supply power to a detector 214. A second voltage regulator 202 may have an input connected to the buck converter voltage output 220. The second voltage regulator 202 may have an output connected to a switch 212. A control input of the switch 212 may be connected to an output of the drive controller 210. An output of the switch 212 may be connected to the second power supply domain 208. The first voltage regulator 200, the second voltage regulator 202 and the switch 212 may be included in a power supply controller 224.

The drive controller 210 may have a control output connected to the driver circuit 216. The drive controller 210 may have control and outputs connected to the detector 214. The drive controller 210 may have an input connection from an output of the detector 214. The detector 214 may have an input connected to the buck converter voltage output 220.

The driver circuit 216 may have an output connected to the power switch circuit 218. An output of the power switches 218 may be connected to a first terminal of an inductor L1. A second terminal of an inductor L1 may be connected to the buck converter voltage output 220. A capacitor C1 may be connected between the buck converter voltage output 220 and a ground connection.

In operation the first power supply domain 206 of the buck converter 2000 is connected to a power source 104 which may for example be a battery. The buck converter voltage output 220 may be connected to a load 222. The buck converter 2000 may have a fixed or programmable desired output voltage level on the buck converter voltage output 220. During the start-up of the buck converter 2000, the second power supply domain 208 may be supplied from the regulated output of the first voltage regulator 200, which in turn receives its power from the power source 104. The drive controller 210 may supply the control signals to the driver circuit 216, which in turn drives the power switches 218. During the start-up mode of operation, the drive controller 210 may generate pulses according to a pulse width modulation mode of operation. The buck converter voltage output 220 may be detected by the detector 214 which may signal to the drive controller 210 when the desired output voltage has been reached. Once the desired output voltage has been reached, the drive controller may control the switch 212 to connect the output of the second voltage regulator 202 to the second power supply domain 208. Alternatively the drive controller 210 may connect the output of the second voltage regulator 202 to the second power supply domain 208 during ramp up of the desired output voltage, but before the desired voltage has been reached. The start-up phase of the buck converter may be an initial time period following power on or a reset of the buck converter. During this period, the buck converter output may be ramping to a predetermined output voltage level. The predetermined output voltage level may be determined for example from a value in a software programmable register (not shown).

The output of the second voltage regulator 202 may be at a higher voltage than the output of the first voltage regulator 200. This may result in all the current required by the second power supply domain 208 being supplied from the output of the second voltage regulator 202 rather than the first voltage regulator 200. Since the second voltage regulator 202 receives its supply from the output of the buck converter 220, rather than directly from the power source 104, the quiescent current drawn from the power source 104 may be significantly reduced. The quiescent current consumption is particularly significant in systems which only have a low load requirement for example 20 mA or less. This may be the case for mobile portable applications where the power source 104 will usually be a battery.

The second voltage regulator 202 may be omitted, for example if the programmed output voltage is the same as the required supply voltage by the second power supply domain. The first voltage regulator 200 may be replaced by a further switch controlled by drive controller 210, for example if the power source 104 has a regulated supply output. In this case, in operation the buck converter may initially connect the power source 104 to the second power domain 208. Once the buck converter output has started to ramp up, the drive controller 210 may connect the buck converter output 220 to the second power supply domain 208 and then disconnect the power source 104 from the second power supply domain 208.

Figure 3:
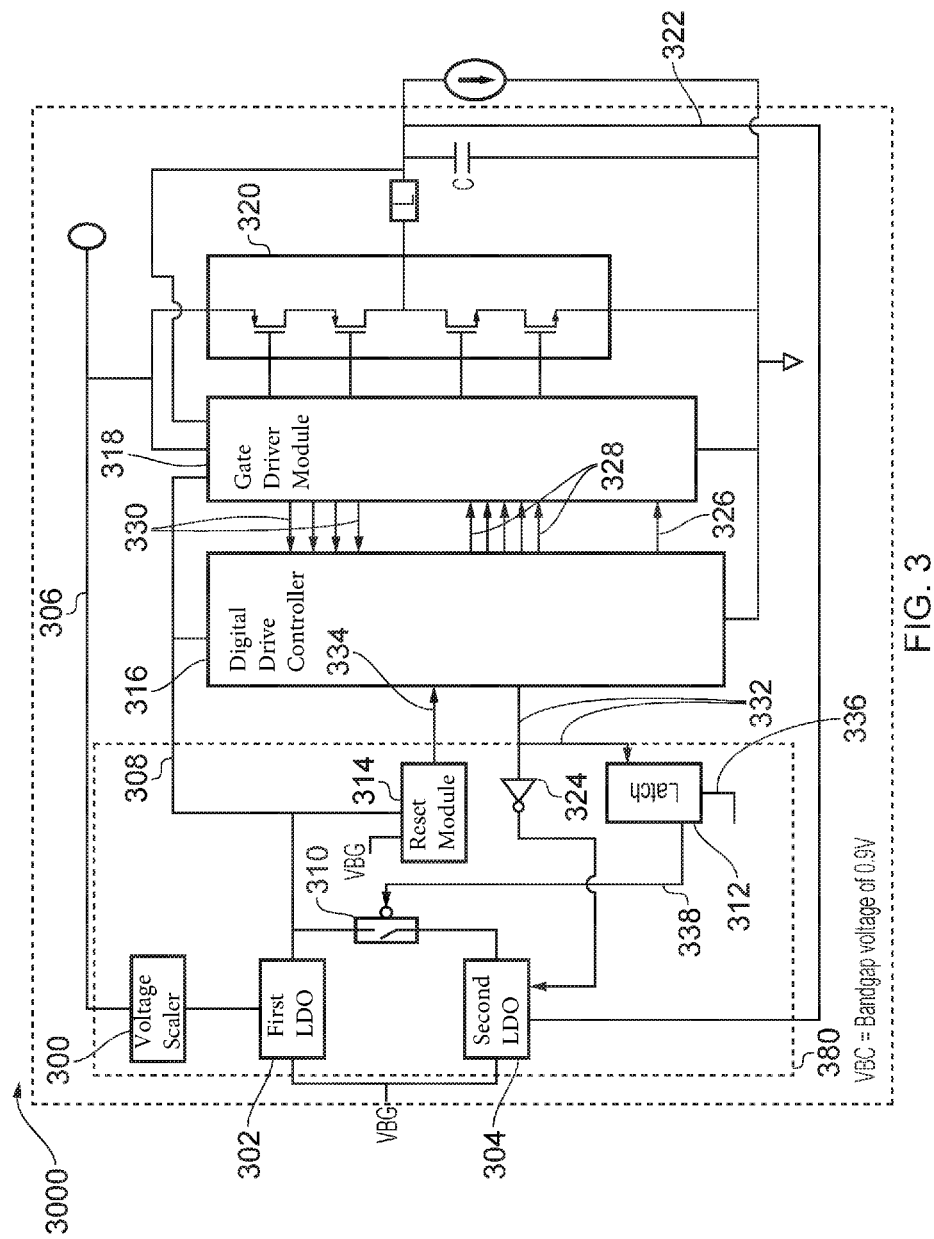
FIG. 3 shows a buck converter according to an embodiment

FIG. 3 shows an embodiment of a buck converter 3000. Voltage scaler 300 may have an input connected to a first power supply domain 306. The voltage scaler 300 may have a voltage output connected to an input of a first low dropout voltage (LDO) regulator 302. The regulated voltage output of the first low dropout voltage regulator 302 may be connected to a second power supply domain 308. A second LDO voltage regulator 304 may be connected to the second power supply domain 308 via a switch 310. The switch 310 may be a PMOS transistor. The second LDO voltage regulator 304 may be connected to the buck converter output 322. The second LDO regulator 304 may have an enable input connected to an output of an inverter 324. The control input of the switch 310 may be connected to an output of a latch 312. The data input of the latch 312 may be connected to a power status output 332 of the digital drive controller 316. The first voltage regulator 302 and the second voltage regulator 304 may have a reference voltage input from a band gap source (not shown).

A reset module 314 may have an input connected to a voltage reference which may be a band gap. The output 334 of the reset module 314 may be connected to the reset input of the digital drive controller 316. The voltage scalar 300, the first voltage regulator 302, the second voltage regulator 304, the switch 310, the latch 312 and the reset module 314 may be considered to be at least part of a power supply controller 380.

The digital drive controller 316 may be connected to the second power supply domain 308. The digital drive controller 316 may have a control output 326 which may typically generate a pulse width modulation signal and/or a pulse frequency modulation signal. The control output 326 may be connected to the detector and gate driver module 318. The digital drive controller 316 may have analog control signal outputs 328 which may be connected to the detector and the gate driver module 318. The digital drive controller may have analog feedback signal inputs 330 which may be connected to an output from the detector and gate driver module 318. The detector and gate driver module 318 may typically include a number of analog sub-module circuits such as a set point DAC, a slope DAC, a peak comparator, and window comparators. The detector and gate driver module 318 may be connected to the first power supply domain 306 and the second power supply domain 308. The detector and gate driver module 318 may be connected to the buck converter voltage output in 322.

The detector and gate driver module 318 may be connected to a power switch module 320. The skilled person will appreciate that the power switch module 320 may consist of a series arrangement of two PMOS transistors connected between the first power supply domain 306 and an output of the power switches 320. The power switch module 320 may include low side power switch including a series arrangement of two NMOS transistors connected between ground and the output of the power switch module 320. The power switch module 320 may include high side power switch including a series arrangement of two PMOS transistors connected between the first power supply domain 306 and the output of the power switch module. The output of the power switch module 320 may be connected to the buck converter output 322 via an inductor L. The capacitor C may be connected between the buck converter output 322 and a around connection.

Figure 4:
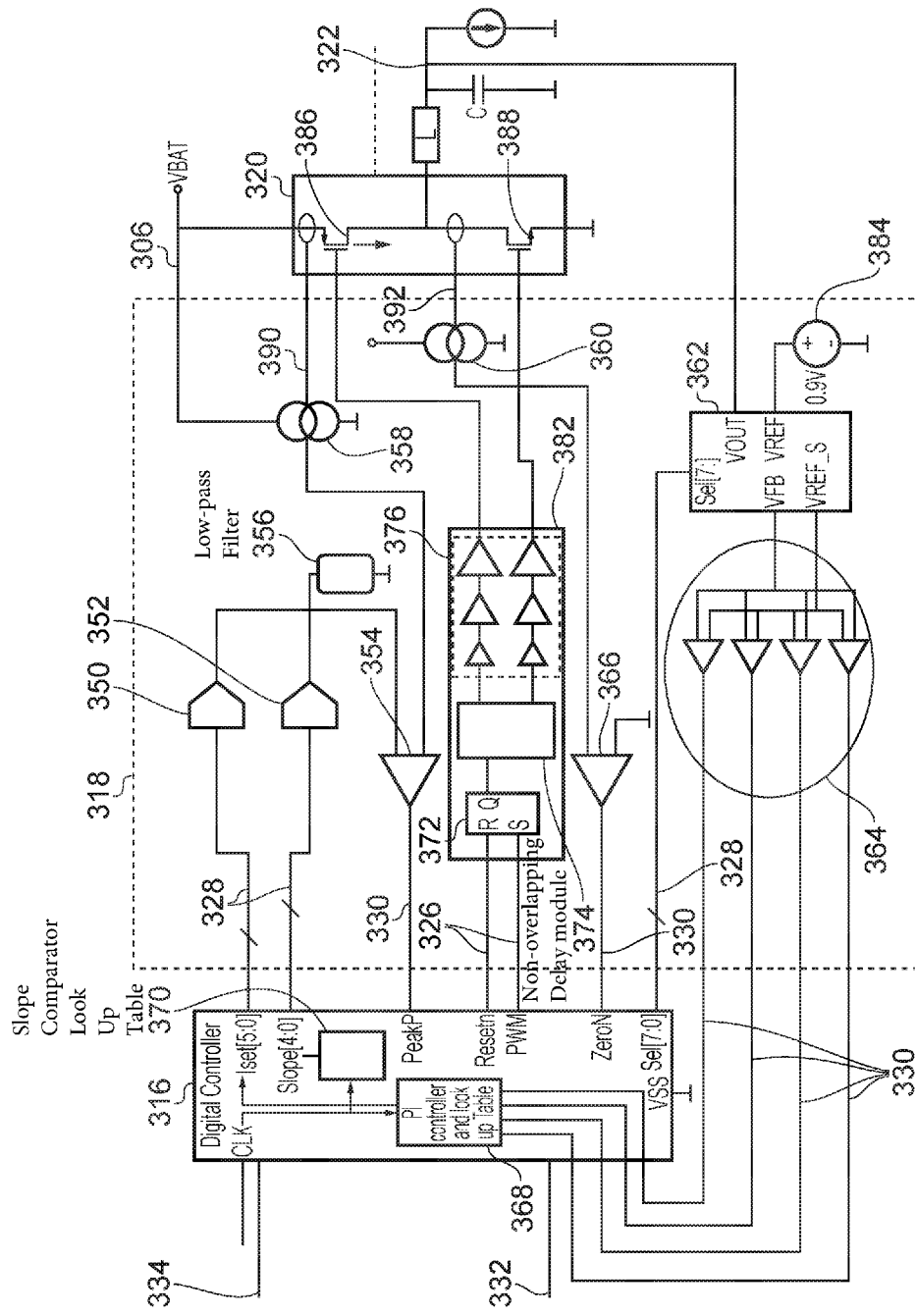
FIG. 4 Illustrates more details circuitry in the buck converter of FIG. 2
Figure 5:
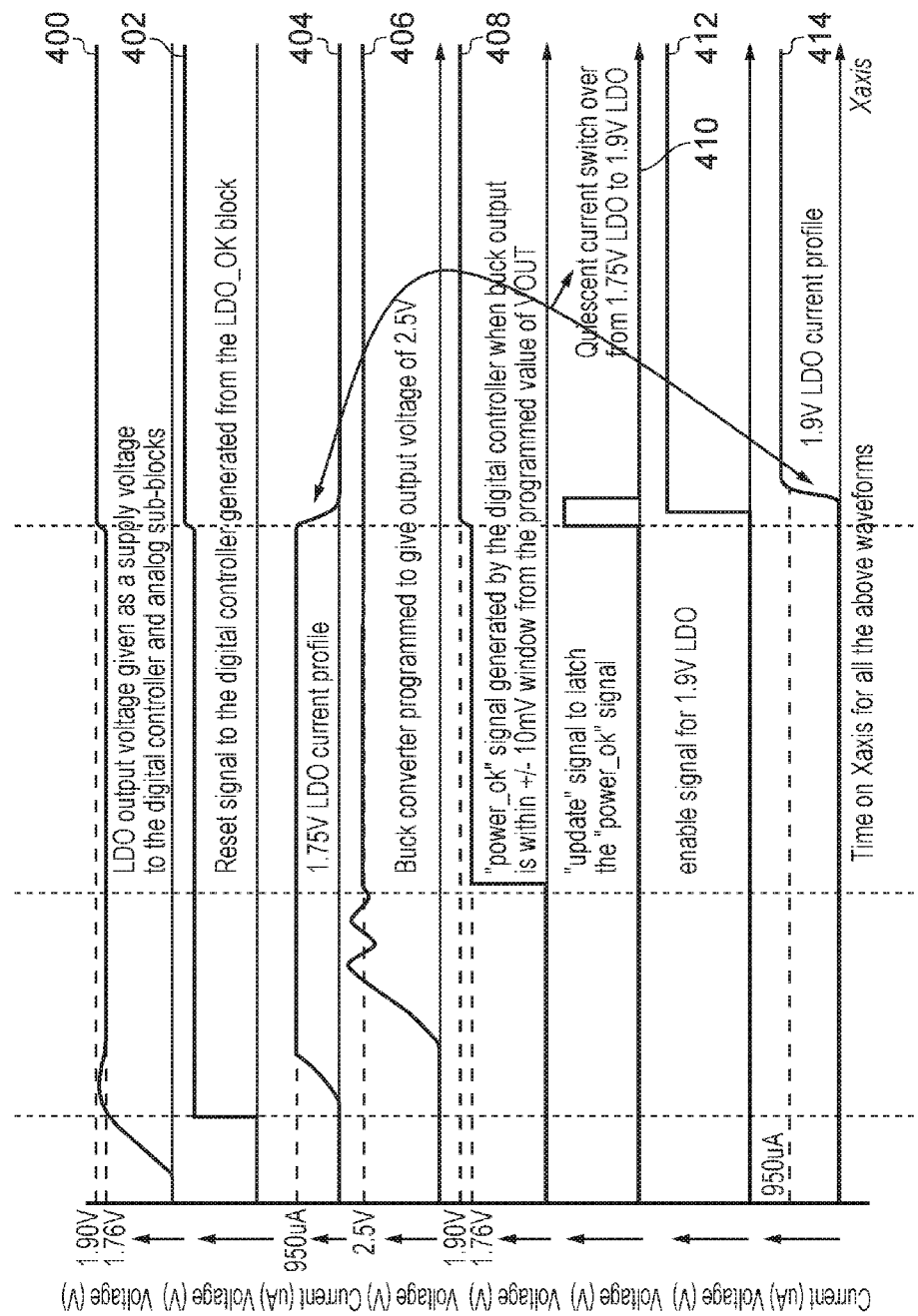
FIG. 5 illustrates signal waveforms during a start-up phase of the buck converter of FIG. 2.

FIG. 4 shows further typical implementation details of the digital drive controller 316 and the detector and gate driver module 318. The digital drive controller 316 may include a proportional integration controller and look up table 368 and a slope comparator look up table 370. The detector and gate driver module 318 may include a set-point digital to analog converter (DAC) 350 and a slope digital to analog converter 352. The output of the set-point DAC 350 and the slope DAC 352 may be connected to a low-pass filter 356. The output of the set-point DAC 350 and the slope DAC 352 may be connected to an input of a peak comparator 354. A second input of the peak comparator 354 may be connected to an output of a high-side power switch current sensor 358. An input of the high-side power switch current sensor 358 may be connected to the first power supply domain 306. The high side power switch current sensor 358 may have a sense input 390 which the skilled person will appreciate is coupled to sense the current flow in the high-side power switch 386. A low-side power switch current sensor 360 may have an input connected to first power supply domain 306. The low side power switch current sensor 360 may have a low side sense input 392 which the skilled person will appreciate is coupled to sense the current flow in the low side power switch 388. The low side power switch current sensor 360 may have an output connected to an input of a zero crossing comparator 366. A feedback divider 362 may have an input connected to the output of the buck converter 3000. An output of the feedback divider 362 may be connected to input of window comparators 364. The outputs of the window comparators 364 may be connected to the proportional integral controller and lookup table 368.

The gate driver 382 may include a set reset latch 372 driven by the control signals 326 from the drive controller 316. An output of the set reset latch 372 may be connected to a non-overlapping delay module 374 which generates non-overlapping control signals for the NMOS and PMOS transistors in the power switch module 320. The respective outputs of the non-overlapping delay module 374 may be connected to a series arrangement of buffers 376. The output of the buffers 376 may be connected to the gates of the PMOS transistor 386 and NMOS transistor 388 of the power switch module 320.

The outputs of the proportional integration controller and look up table 368 may be connected to the input of the set point DAC 350. The output of the peak comparator 354 and the zero crossing comparator 366 may be connected to the digital drive controller 316. Control inputs of the feedback divider 362 may be connected to outputs of the digital drive controller 328 to program the required buck converter output voltage level.

The operation of the buck converter 3000 is as follows with reference to FIG. 4 which shows a waveform diagram 4000. Waveform diagram 4000 has time on the X-axis and a first waveform 400 showing the variation of the voltage on the y axis with respect to time for the second power supply domain 308. A second waveform 402 shows the reset signal voltage output 334 from the reset module 314. A third waveform 404 shows an example current profile of the first LDO voltage regulator 302 which may vary between 0 and 950 µA. A fourth waveform 406 illustrates the output of the buck converter 322 when programmed to output a voltage of 2.5 volts. A fifth waveform 408 shows the voltage waveform of the power_ok signal output 332 from the digital drive controller 316. A sixth waveform 410 shows the update signal 336. Seventh waveform 412 shows the control signal voltage to the switch 310 output from the latch 312. Eighth waveform 414 show the current profile of the second LDO voltage regulator 304.

The first power domain 306 is connected to a power supply, for example a battery (not shown) which may supply a voltage between 3 volts and 12 volts. The voltage supplied to the first power supply domain 306 may be scaled by the voltage scaler 300 to a voltage which may be in the range for example of 3 V to 5.5 V. During the start-up the first LDO voltage regulator 302 may be enabled and the second LDO voltage regulator 304 may be disabled. As a result, all the quiescent current required for the buck operation may be delivered by the first LDO voltage regulator 302, which in turn comes from the supply to the first power supply domain 306.

The first LDO voltage regulator 302 may output a regulated voltage of for example 1.75 volts. The second LDO voltage regulator 304, when enabled, may output a regulated voltage of, for example 1.9 volts.

During start-up of the buck converter 3000, the digital drive controller 316 may start in a PWM mode of operation. The digital drive controller may generate a PWM control signal switching at for example 3 MHz which may be derived from a 24 MHz clock generated by an RC oscillator in the detector and gate driver module 318. When the output of the first voltage regulator 302 is stabilised, the reset module 314 may generate a reset signal 334 to the digital drive controller 316 at time t1 shown on waveform diagram 4000. The output of the first voltage regulator may for example stabilize at 1.75 volts. After time t1, the current profile of the first LDO voltage regulator 302 may increase to a value of 950 µA as shown for example on third waveform 404. The reset signal may reset all the flip-flops in the digital drive controller 316 such that the digital drive controller 316 starts from a known state. The digital drive controller 316 may generate enable signals on control lines 328 and the PWM control signal on control line 326. Based on the PWM signal, the gate driver may drive the NMOS and PMOS transistors in the power switch module 322 to chop the supply voltage supplied to the first power domain 306. The mark space ratio of the PWM signal may be varied according to the desired output voltage. The skilled person will appreciate that the desired output voltage may be a user-programmable value.

The digital drive controller 316 may also generate a reset pulse at the start of every PWM cycle, which may turn on the PMOS Power switch transistors in the power switch module 320 and allows the current to flow from battery supply to the output load. The buck converter 3000 may have two control loops present. One control loop for voltage sense and one control loop for current sense. The required output voltage may be set by the control signal 328 coining from the drive controller 316. For the voltage sense loop, the four window comparators 364 which may compare the buck output so as to check in which window the output voltage falls. Voltage windows may for example be within 5 my and 20 mv above and below the reference signal level. A 4 bit digital code may be output from the four window comparators 364 which updates the Proportional and Integral (PI) coefficient values in the PI controller and look up table 368. The drive controller 316 may set the set point code for the set-point DAC 350 which may convert the digital information into an analog voltage. The error control voltage, which is the voltage difference between the reference voltage and buck output voltage may be slope compensated and input to the slope DAC 352 For the current sense loop, the skilled person will appreciate that the current flowing in the inductor may be sensed by a high-side power switch input current sensor 358 which replicates the scaled down version of current flowing in the PMOS transistor in the power switch module 320. This current may converted to a voltage which may be compared with the voltage output from the slope DAC 352 and set point DAC 350 a peak comparator 354.

The output of the peak comparator 354 may be an input to the digital controller 316 which may then change the PWM control signal to turn on the NMOS power switch in the power switch module 320, which typically completes the PWM cycle. Thus by changing the duty cycle of the PWM control signal with the help of the voltage and current sense loop output voltage is scaled down and is regulated for the given load current.

Once the output voltage of the buck converter reaches the programmed value the power status signal 332 which in this example is an active high signal may be generated by the digital controller 316. The power status signal 332 may indicate that the desired buck converter output voltage has been reached and goes logic high at time t2 as shown on fifth waveform 408. The power ok signal 332 may be inverted by inverter 324 and used as an enable signal for the second LDO voltage regulator 304. The output of the first LDO voltage regulator 302 and the second LDO voltage regulator 304 may be shorted through a switch 310. The control to the switch 310 is generated by the switch enable signal 338. To have the controllability of switchover from outside world, a "power_ok" signal 332 may be latched by an update signal 336 input to the latch 312. The power ok signal 332 is latched at time t3 on waveform diagram 4000. In alternative implementations the latch 312 and the inverter 324 may be omitted.

The outputs of the first LDO voltage regulator 302 and the second LDO voltage regulator 304 may be shorted together through the switch 310 and supply power to the second supply domain 308. When the update signal 336 is logic high, shown at time t3, the switch 310 is enabled and the outputs of the two LDO voltage regulators 302, 304 may be shorted together. The voltage output of the second LDO voltage regulator 304 may be higher than the voltage output of the first LDO voltage regulator 302. For example, the voltage output of the second voltage regulator 304 may be 1.9V and the voltage output of the first voltage regulator 302 may be 1.75V. In this case, the higher voltage drive of the second voltage regulator 304 will cause the first LDO voltage regulator 302 to go out of regulation and consequently quiescent current delivered from the first MO voltage regulator 302 may be slowly steered to be delivered from the second MO voltage regulator. Since the supply to the second MO voltage regulator is derived from the output 322 of the buck converter 3000, consequently all the quiescent current may be delivered by the buck converter output 322. The switch 310 may be a 5 volt PMOS device, consequently shorting the two LDO regulator outputs will not damage the first LDO voltage regulator 302 and no quiescent current will be delivered by the first LDO voltage regulator 302. This mechanism ensures that there will be no glitch on the second power supply domain 308 and the output of reset module 314 will not be affected. Thus digital controller 316 does not reset during supply switchover. After time t3, once the second LDO voltage regulator is enabled, the current profile of the first LDO voltage regulator 302 reduces to zero as shown on third waveform 404. After time t3, the current profile of the second LDO voltage regulator 304 increases from 0 to 950 µA as shown on eighth waveform 414.

The efficiency of the buck converter is normally given as:

$$\text{Efficiency} = \frac{Vout * Iout}{Vin * \delta * Iin + Vin * Iq + \text{switching loss}}$$

Iq=Quiescent current consumption

δ Duty Cycle of the buck converter

Vin=Input voltage, Vout=output voltage, Iout=load current

Iin=Input current and Vin*Iq=Quiescent power loss

After the quiescent current switch over to the buck output the efficiency equation changes to the following:

$$\text{Efficiency} = \frac{Vout * Iout + Vout * Iq}{Vin * \delta * Iin + \text{Switching Loss}}$$

As shown in table 1, when the supply switch over is activated all the quiescent current is delivered from the output supply of the buck converter and no quiescent current comes from the supply to the first power supply domain, which in this example is a battery. As a result the quiescent current is reduced thereby increasing the buck converter efficiency. Table 1 also indicates that if the load current is reduced further, the percentage improvement in the efficiency due to this technique is even higher. For a load current of 12 mA efficiency improves by 8% due to supply switch over. The buck converter 3000 may increase the efficiency for applications with low load currents which may be for example in the range below 20 mA. The buck converter may increase efficiency for light loads without switching to pulse frequency modulation (PFM) mode of operation. For systems such as ZigBee lighting systems, which may be powered by the buck converter, the frequencies generated by a PFM mode of operation may interfere with RF circuitry.

TABLE 1

Simulation Results
Nominal Corner 25 Degrees Celsius

| | Input Battery Voltage (V) | | | |
| --- | --- | --- | --- | --- |
| | VIN = 3 V | | VIN = 3 V | |
| | Programmed Output Voltage (V) | | | |
| | 2.30 | | 2.30 | |
| | Condition | | | |
| | Without Switchover | With Switchover | Without Switchover | With Switchover |
| Measured VOUT (V) | 2.28 | 2.28 | 2.28 | 2.28 |
| Measured Load current (mA) | 20.00 | 20.00 | 12.00 | 12.00 |
| Measured Coil Current | 20.00 | 20.95 | 12.00 | 12.95 |

TABLE 1-continued

Simulation Results
Nominal Corner 25 Degrees Celsius

| | Input Battery Voltage (V) | | | |
|---|---|---|---|---|
| | VIN = 3 V | | VIN = 3 V | |
| | Programmed Output Voltage (V) | | | |
| | 2.30 | | 2.30 | |
| | Condition | | | |
| | Without Switchover | With Switchover | Without Switchover | With Switchover |
| Battery Voltage VIN (V) | 3.00 | 3.00 | 3.00 | 3.00 |
| Ideal VBAT current consumption | 15.23 | 15.95 | 9.14 | 9.86 |
| Measured VBAT current consumption (mA) | 18.25 | 18.00 | 12.09 | 11.86 |
| % Efficiency | 83.43 | 88.61 | 75.57 | 83.14 |
| Quiescent current from input supply (mA) | 0.95 | 0.00 | 0.95 | 0.00 |
| % Quiescent current loss | 5.21 | 0.00 | 7.86 | 0.00 |
| IR + Switching current (mA) | 2.07 | 7.05 | 2.00 | 2.00 |
| % IR + switching loss | 11.36 | 11.39 | 16.58 | 16.86 |

The increased efficiency may result in prolonged battery life for applications/products which are powered by battery and include the buck converter, such as portable mobile devices, portable wireless sensors, sensitive health care devices and wireless controllers for dimming of LED bulbs, for example in a ZigBee Link Light. The efficiency loss due to the quiescent current conduction from the battery supply for applications under light load conditions where this type of loss becomes significant part of the total losses which are due to switching loss, conduction loss, as well as the quiescent current.

Figure 6:
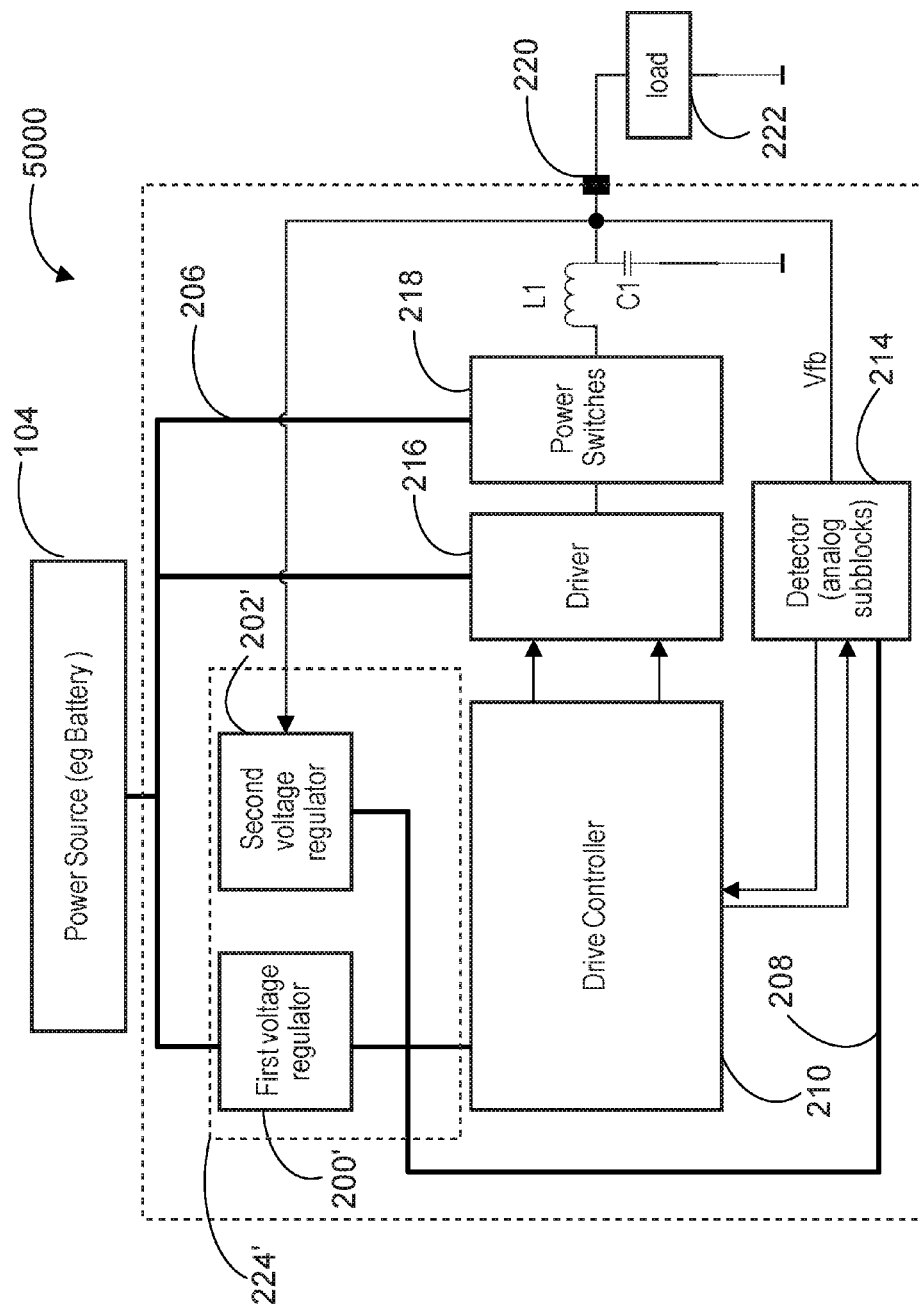
FIG. 6 shows a buck converter according to an embodiment.

FIG. 6 illustrates a buck converter 5000. A first voltage regulator 200' may have an input which is coupled to a first power supply domain 206. The first voltage regulator 200' may have a voltage output connected to a second power supply domain 208. The first power supply domain 206 may supply power to a driver circuit 216 of the synchronous buck converter 2000. The first power supply domain 206 may supply power to the power switches 218. The second power supply domain 208 may supply power to a drive controller 210. The second power supply domain 208 may supply power to a detector 214. A second voltage regulator 202' may have an input connected to the buck converter voltage output 220. The second voltage regulator 202 may have an output connected to the second power supply domain 208. The second voltage regulator 202' may have a lower output impedance than the first voltage regulator 200'. The first voltage regulator 200', and the second voltage regulator 202' may be considered to be part of a power supply controller 224'. The drive controller 210 may have a control output is connected to the driver circuit 216. The drive controller 210 may have control and outputs connected to the detector 214. The drive controller 210 may have an input connection from an output of the detector 214. The detector 214 may have an input connected to the buck converter voltage output 220. The driver circuit 216 may have an output connected to the power switch circuit 218. An output of the power switches 218 may be connected to a first terminal of an inductor L1. A second terminal of an inductor L1 may be connected to the buck converter voltage output 220. A capacitor C1 may be connected between the buck converter voltage output 220 and a ground connection. In operation, the buck converter 5000 is connected to a power source 104, for example a battery. At start-up or reset of the buck converter 5000, the supply current to the second power supply domain 208 may initially be supplied from the first power supply domain 206. As the voltage at the buck converter output 220 increases, the second power supply domain 208 may preferentially draw current from the second voltage regulator 202' since it has a lower output impedance than the first voltage regulator 200'. Consequently the current drawn from the first voltage regulator 200' which is supplied directly from the power source 104 is reduced. This may improve the efficiency of the buck converter 5000 by reducing the quiescent current drawn from the power source 104. For low power and portable systems where the power source 104 is a battery, this may prolong the life of the battery.

Figure 7:
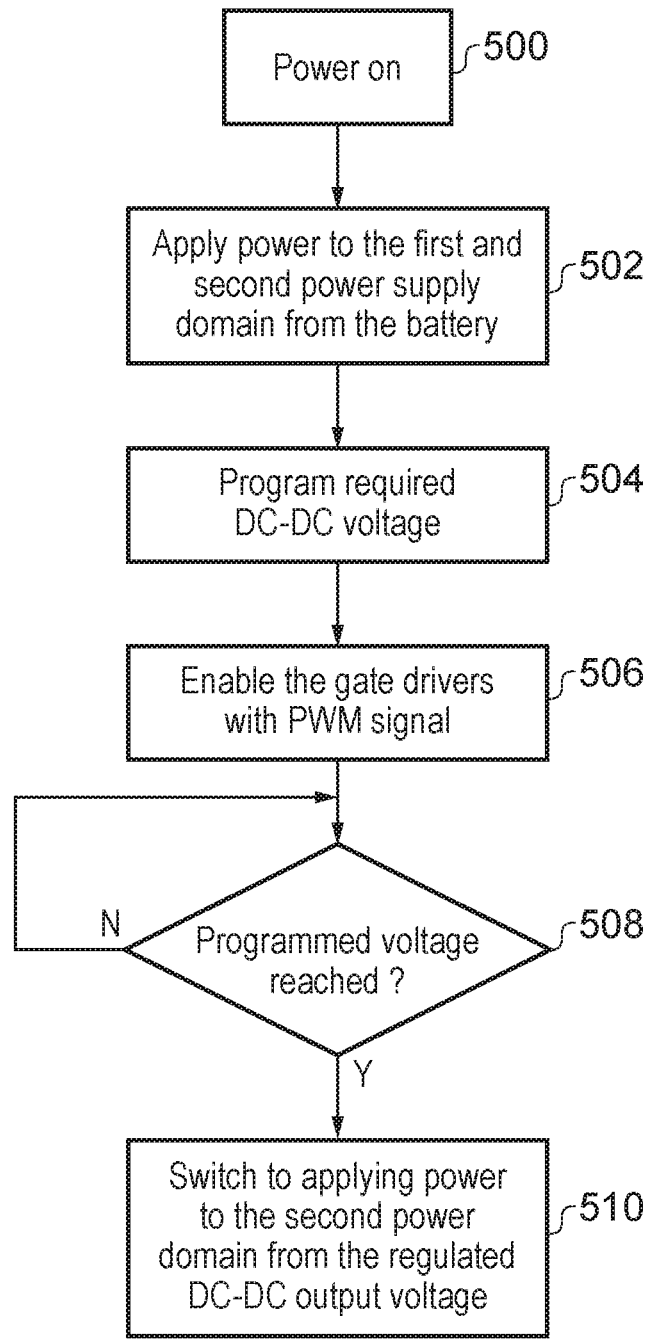
FIG. 7 illustrates a method of operation of a buck converter according to an embodiment.

FIG. 7 shows a method of operatin a buck converter 6000. In step 500 power is applied to the buck converter, this may be supplied from for example a battery. In step 502 the power is applied to the first power domain from the battery, and the second power supply domain from a regulated battery voltage output. In step 504, the required DC output voltage from the buck converter may be programmed. In step 506, the gate drivers of the buck converter may be enabled by generating a PWM signal. In step 508, a check may be made to determine whether or not the desired all programmes output voltage of the converter has been reached. If the programme voltage has not been reached, the method stays at step 508 and periodically re-checks whether or not voltage has been reached. When the programmed voltage has been reached, the method moves onto step 510 and the power supplied to the second power supply domain is switched from being supplied via the regulated battery voltage to being supplied from the regulated output voltage of the buck converter.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A buck converter comprising:
a buck converter output configured to output an output supply voltage;
a first power supply domain configured to be coupled to a power source;
a second power supply domain;
a power supply controller coupled to the first power supply domain, the second power supply domain and the buck converter output;
wherein the power supply controller is configured to supply power to the second power supply domain from at least one of the first power supply domain and the buck converter output, in dependence on the buck converter output supply voltage; and
wherein the power supply controller further comprises
a first voltage regulator having a first voltage regulator input configured to be coupled to the power source, and a first regulated voltage output coupled to the second power supply domain; and
a second voltage regulator having a second voltage regulator input coupled to the buck converter output and a second voltage regulator output coupled to the second power supply domain.

2. The buck converter of claim 1:
wherein the first voltage regulator has a higher output impedance than the second voltage regulator.

3. The buck converter of claim 1:
wherein the first voltage regulator further comprises a voltage scaler.

4. The buck converter of claim 1
wherein the power supply controller further comprises a switch arranged between the buck converter output and the second power supply domain and
wherein the power supply controller is operable to switchably couple the buck converter output to the second power supply domain.

5. The buck converter of claim 4
wherein the power supply controller is operable to switchably couple the buck converter output to the second power supply domain during a start-up phase of the buck converter.

6. The buck converter of claim 4
wherein the power supply controller is operable to switchably couple the buck converter output to the second power supply domain in response to the buck converter output stabilizing.

7. The buck converter of claim 4
further comprising a further switch arranged between the first power supply domain and the second power supply domain,
wherein the further switch is coupled to the controller and the controller is operable to decouple the first power supply domain from the second power supply domain when the output of the second voltage regulator is switchably coupled to the second power supply domain.

8. The buck converter of claim 1:
wherein at least one of the first voltage regulator and the second voltage regulator comprises a low drop-out regulator.

9. The buck converter of claim 1:
wherein the first voltage regulator is configured to output a regulated voltage value which is less than the second regulated voltage output.

10. The buck converter of claim 1 comprising
a pulse-width modulation controller coupled to the second power supply domain.

11. The buck converter of claim 1 further comprising
a plurality of MOS power switches coupled to the first power supply domain.

12. The buck converter of claim 11 further comprising
a gate driver coupled to each of the gates of the plurality of MOS power switches and wherein the gate driver is coupled to the first power supply domain.

13. A RF transceiver comprising the buck converter of claim 1.

14. The buck converter of claim 1, further comprising:
a drive controller coupled to the second power supply domain; and
a detector coupled to the drive controller and the buck converter output and configured to output a signal to the drive controller in response to a desired output voltage on the buck converter output.

15. The buck converter of claim 1:
wherein the power supply controller further comprises a reset module coupled to the drive controller and the second power supply domain; and
wherein the reset module is operable to reset the drive controller in response to the first voltage regulator output stabilizing.

16. A method of operating a buck converter, the buck converter comprising
a buck converter output,
a first power supply domain configured to be coupled to a power source,
a second power supply domain coupled to the first power supply domain,
a power supply controller coupled to the first power supply domain, the second power supply domain and the buck converter output;
wherein the power supply controller is configured to supply power to the second power supply domain from the first power supply domain or the buck converter output, in dependence of the buck converter output supply voltage; and
wherein the power supply controller further comprises
a first voltage regulator having a first voltage regulator input configured to be coupled to the power source, and a first regulated voltage output coupled to the second power supply domain; and
a second voltage regulator having a second voltage regulator input coupled to the buck converter output and a second voltage regulator output coupled to the second power supply domain.

* * * * *